United States Patent
Tsaur et al.

(10) Patent No.: US 8,925,034 B1
(45) Date of Patent: Dec. 30, 2014

(54) DATA PROTECTION REQUIREMENTS SPECIFICATION AND MIGRATION

(75) Inventors: Ynn-Pyng "Anker" Tsaur, Oviedo, FL (US); Douglas J. Fletcher, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 1083 days.

(21) Appl. No.: 12/495,090

(22) Filed: Jun. 30, 2009

(51) Int. Cl.
*G06F 21/00* (2013.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | |
|---|---|---|
| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |
| 5,978,788 A | 11/1999 | Castelli et al. |
| 5,978,791 A | 11/1999 | Farber et al. |
| 6,003,087 A | 12/1999 | Housel, III et al. |

(Continued)

FOREIGN PATENT DOCUMENTS

| | | |
|---|---|---|
| WO | WO97/00475 | 1/1997 |
| WO | WO97/46955 | 12/1997 |
| WO | WO98/11723 | 3/1998 |

OTHER PUBLICATIONS

Japanese Patent Application Laid-open No. Hei 10-133976, May 22, 1998.

(Continued)

*Primary Examiner* — William Goodchild
(74) *Attorney, Agent, or Firm* — Rory D. Rankin; Meyertons, Hood, Kivlin, Kowert, Goetzel, P.C.

(57) ABSTRACT

Computer systems and methods for protecting data. A computer system includes a processor, a policy generator, and resources. Each resource has associated data. The processor accesses a data protection requirements specification (DPRS). The DPRS uses a common, non-application specific schema to represent first and second schema for expressing data protection policies. The processor triggers the policy generator to generate a first data protection policy for protecting a resource. The processor uses the first data protection policy to protect data associated with the resource. To generate the first data protection policy, the policy generator scans the DPRS and identifies elements of the DPRS. The elements of the DPRS are pre-defined in the common schema. The policy generator translates values of the elements to corresponding attributes of the first data protection policy expressed in the first schema. A value of a first element in the common schema corresponds to the resource to be protected.

17 Claims, 7 Drawing Sheets

(56) References Cited

U.S. PATENT DOCUMENTS

| | | | |
|---|---|---|---|
| 6,009,410 | A | 12/1999 | LeMole et al. |
| 6,073,129 | A | 6/2000 | Levine et al. |
| 6,088,524 | A | 7/2000 | Levy et al. |
| 6,122,628 | A | 9/2000 | Castelli et al. |
| 6,311,221 | B1 | 10/2001 | Raz et al. |
| 6,738,908 | B1 * | 5/2004 | Bonn et al. ............ 726/4 |
| 7,325,161 | B1 | 1/2008 | Rakic et al. |
| 7,360,110 | B1 | 4/2008 | Schmokel et al. |
| 7,360,123 | B1 | 4/2008 | Westenberg et al. |
| 7,386,752 | B1 | 6/2008 | Rakic et al. |
| 7,735,057 | B2 | 6/2010 | Rachman et al. |
| 8,261,122 | B1 | 9/2012 | Kappel et al. |
| 2003/0154404 | A1 * | 8/2003 | Beadles et al. ............ 713/201 |
| 2004/0230971 | A1 | 11/2004 | Rachman et al. |
| 2007/0283017 | A1 * | 12/2007 | Anand et al. ............ 709/226 |
| 2008/0010630 | A1 | 1/2008 | Ou-Yang et al. |

OTHER PUBLICATIONS

Japanese Patent Application Laid-open No. Sho 64-36332, Jul. 2, 1989.
Japanese Patent Application Laid-open No. Hei 10-162057, Jun. 19, 1998.
G. Glass, "A Universal Streaming Service," C× × Report, Apr. 1996, pp. 74-76 and 81-83.
T. Ritchey, "Java!", New Riders Publishing, Dec. 1995, pp. 214-216.
Chen, Z. et al., (Dec. 11-14, 1995) "Real time video and audio in the world wide web" World Wide Web Journal, Fourth International World Wide Web Conference, pp. 333-348.
Jiang, Z. and Kleinrock, L. (1997) "Prefetching links on the WWW" IEEE International Conference on Communications (ICC), US, New York, NY: IEEE, pp. 483-489.
M. Schwartz, "Telecommunication Networks: Protocols, Modeling and Analysis", Jan. 1, 1987; Addison-Wesley Publishing Company, pp. 266-283.
J. Basu et al., "Degrees of Transaction Isolation in SQL *Cache: A Predicate-based Client-side Caching System", May 15, 1996, pp. 1-22.
Amit Shukla et al., "Storage Estimation for Multidimensional Aggregates in the Presence of Hierarchies", VLDB Conference Mumbai (Bombay), 1996, pp. 522-531.
Dale Skeen, "New Forms of Persistent Queries are Necessary to Handle Live Business Data as it Speeds Through a Company", internet website www.byte.com BYTE Magazine, Feb. 1998, 5pgs.
V. Hoff et al., "The Open Software Description Format (OSD)", internet website www.w3.org, Aug. 11, 1997, pp. 1-13.
Red Brick Vista, "Aggregate Computation and Management", internet website www. informix.com, printed Oct. 4, 2000.
Fireclick, "Web Site Performance is Key to E-Commerce Sucess", internet website WWW. Fireclick.com printed, Nov. 1, 2000.
Boost Web Optimizer Technology Overview, "How it Works", Sep. 27, 2000 and internet website www.boostworks.com printed Nov. 1, 2000.
"Delivering Windows to the Net White Paper", WinToNet by Menta Software, 2000 and Website http://216.205.21.102/ printed Nov. 1, 2000.
"First There was Streaming Audio, then Streaming Video. Now get ready for Streaming Software", Stream Theory White paper and Website WWW.Streamtheory.com printed Sep. 22, 2000.
"OSD Describing Software Package on the Internet", Marimba Inc. White paper 1998 and wedsite www.marimba. com, printed Nov. 1, 2000.
"Timbale for Windows Terminal Services" Marimba Promotional document, undated, 2000.
Japanese Patent Application Laid-open No. Hei 8-51596, Feb. 20, 1996.
Japanese Patent Application Laid-open No. Hei 10-91446, Apr. 10, 1998.
Japanese Patent Application Laid-open No. Hei 7-271603, Oct. 20, 1995.
Japanese Patent Application Laid-open No. Hei 8-6878, Jan. 12, 1996.
Yang Yu, et al: "A Feather-weight Virtual Machine for Windows Applications"; Jun. 14, 2006; pp. 24-34.
Japanese Patent Application Laid-open No. Hei 10-133976 May 22, 1998.
Japanese Patent Application Laid-open No. Sho 64-36332 Feb. 07, 1989.
Japanese Patent Application Laid-open No. Hei 10-162057 Jun. 19, 1998.
G. Glass, "A Universal Streaming Service", C+ + Report, Apr. 1996, pp. 74-76 and 81-83.
Westenberg et al., U.S. Appl. No. 10/881,897, entitled "Configuring a protection solution by subtracting from a comprehensive solution", filed Jun. 30, 2004.
"OASIS DCML Framework TC", OASIS—Advancing open standards for the information society, 2014, https://www.oasis-open.org/committees/tc_home.php?wg_abbrev=dcml-frame#feedback, 2 pages. [Retrieved Aug. 4, 2014].

* cited by examiner

DATA PROTECTION REQUIREMENTS SPECIFICATION AND MIGRATION

BACKGROUND OF THE INVENTION

1. Field of the Invention

This invention relates to computer systems and, more particularly, to data protection methods within computer systems.

2. Description of the Related Art

There is an increasing need for organizations to protect data that resides on a variety of host devices via some type of data protection application. Data protection applications maybe employed to protect data from loss due to user error, system failure, outages, and disasters, etc. as well as archiving information for regulatory compliance, workflow tracking, etc. For example, data protection applications may schedule and perform various data protection methods such as full backups, incremental backups, replications, snapshots, etc. Different methods may be used in different circumstances. For example, if a user desires to protect a complete volume, a volume backup may be performed in which the entire contents of a particular disk drive are stored as a monolithic backup dataset. Volume backups may provide the advantage of rapid restoration. However, volume backups consume storage resources for data that may not need to be protected. For example, there may be times when protection may be desired for data related to one or more applications only.

An alternative approach to data protection is file-by-file backup. In file-by-file backup, a backup agent may identify a particular application to be protected and convey a copy of only those files that are related to the identified application to a backup medium including any metadata that may be required to restore the application-related files into the context of the application. File-by-file backups may therefore consume less storage space than volume backups. However, restoration from a file-by-file backup may be slower than restoration from a volume backup. Typically, to restore files to an application, the backup files may be copied to a temporary location from which a user may browse, search, or otherwise select files to be restored. While this approach allows for granular recovery of data files, it may be unnecessarily time-consuming.

Backup methods such as those described above may be performed in accordance with the values of a complex variety of configuration parameters. Among these parameters may be the type of resource to be protected, a priority level for the resource, the type of operation to be performed, the type of storage to be used to store a backup dataset, the time and frequency of performing the operation, the type of recovery technology that is to be applied to the resource backup dataset, and retention policies of the backup dataset, etc. A data protection application may store a particular set of values of the above parameters as a data protection policy. Unfortunately, to configure a particular data protection policy, an administrator or other user may be asked to select values for each of these parameters, which may be a time-consuming, complex, and error-prone operation.

In addition, each different data protection application may provide a different subset of the above parameters for configuration. For example, different data protection applications may support different sets of resource types. Some data protection applications may support only a single resource for each policy while others may support multiple resources per policy. Other parameters may be mismatched among data protection applications including support of different backup methods, storage management features, and backup retention features. Further, each different data protection application may have its own terminology for specifying the above parameters. Still further, each different data protection application may have a distinct user interface through which to establish values for these configuration parameters. Configuring a data protection policy may require a user to navigate through numerous dialog windows and correctly configure numerous arcane settings. For large environments, setting up many data protection policies may be a very challenging and tedious task. Moreover, any expertise that an administrator acquires in configuring a first data protection application may not be applicable to other data protection applications.

The above considerations may be rendered especially relevant when it becomes desirable or necessary to migrate data protection from one data protection application to another. Also, it may be difficult to translate existing policies to take advantage of new features of a new or updated data protection application. In view of the above, a more effective system and method for establishing data protection policies and configurations that accounts for these issues are desired.

SUMMARY OF THE INVENTION

Various embodiments of a computer system and methods are disclosed. In one embodiment, a computer system includes a processor, a policy generator, and resources, each resource having associated data that may be protected. The processor accesses a data protection requirements specification (DPRS). The DPRS uses a common schema to represent at least a first and a second schema for expressing data protection policies. The processor triggers the policy generator to generate a first data protection policy for protecting a resource. The processor uses the first data protection policy to protect data associated with the resource. To generate the first data protection policy, the policy generator scans the DPRS and identifies elements of the DPRS. The elements of the DPRS are pre-defined in the common schema. The policy generator translates values of the elements to corresponding attributes of the first data protection policy expressed in the first schema. A value of a first element in the common schema corresponds to the resource to be protected.

In one embodiment, the first data protection policy includes tasks to be performed to protect the resource, each task having at least one of the attributes. In a further embodiment, the attributes include storing data used to protect the resource on a particular type of medium, executing tasks at a particular frequency, and/or retaining data used to protect the resource for a particular length of time.

In a still further embodiment, at least one element specifies that other elements are required, preferred, or are to be used as a hint in adding a task to the first data protection policy. In a still further embodiment, at least one element specifies a frequency level and the processor includes in the first data protection policy, a frequency of execution of data protection tasks for the resource corresponding to the frequency level. In a still further embodiment, at least element specifies a retention level and the processor includes in the first data protection policy, a time period during which a dataset that is used to protect the resource is retained that corresponds to the retention level.

In another embodiment, the processor receives requirements for protecting data associated with the resource as user input data. The processor converts the user input data into the DPRS using one or more elements pre-defined by the common schema In yet another embodiment, the first data protection policy protects data associated with the resource using a first data protection application. The processor extracts attributes from the second data protection policy. The attributes are expressed in the second schema. The processor maps the extracted attributes to values of elements pre-defined by the common schema and uses the values of elements pre-defined by the common schema in the DPRS These and other embodiments will become apparent upon consideration of the following description and accompanying drawings.

DETAILED DESCRIPTION

Figure 1:
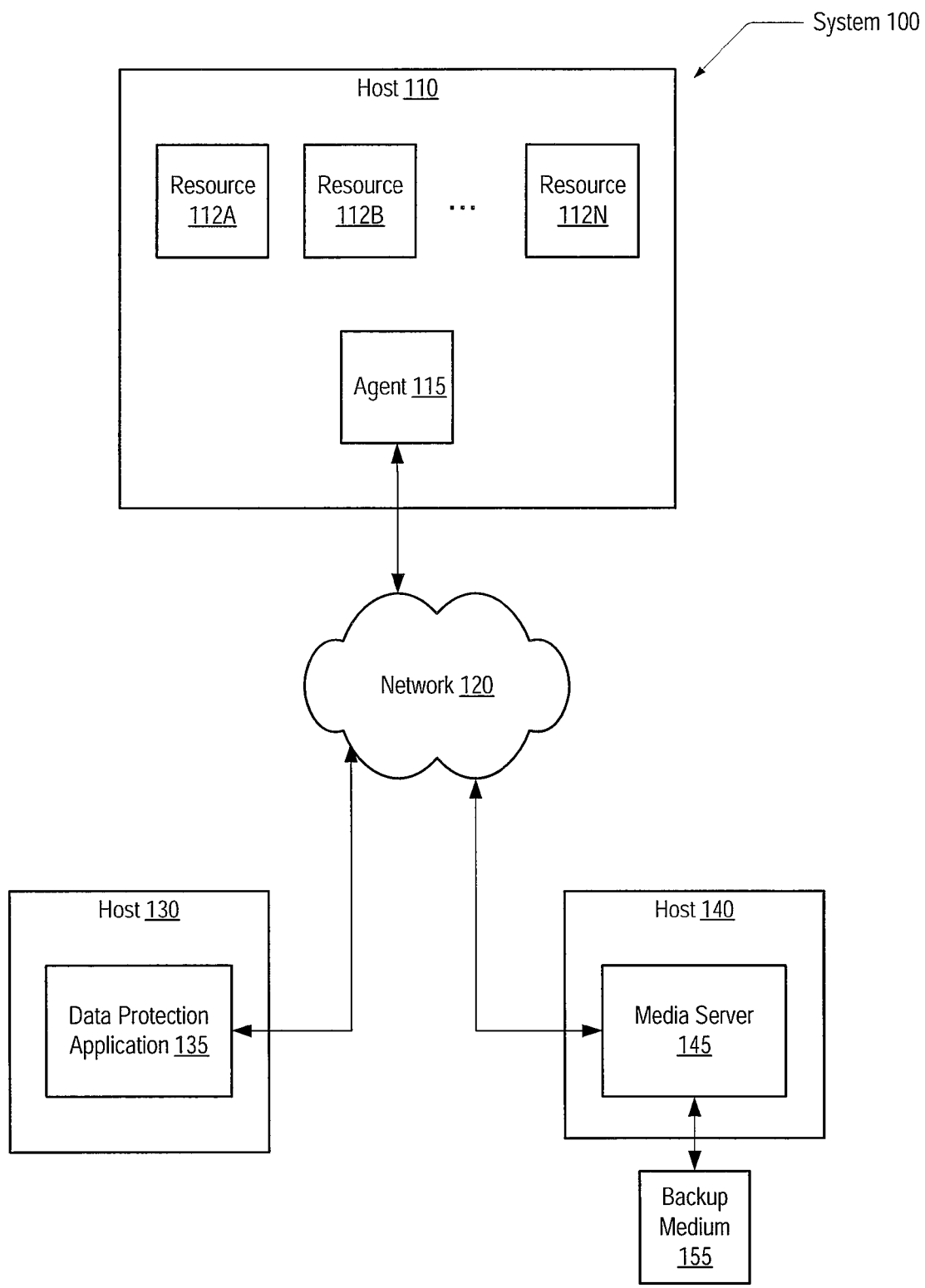
FIG. 1 illustrates one embodiment of a computer system.

FIG. 1 illustrates one embodiment of a computer system 100. As shown, system 100 includes hosts 110, 130, and 140 interconnected through a network 120. In one embodiment, network 120 may include one or more interconnected local area networks (LAN), wide area networks (WAN), the Internet, and/or one or more modem banks that are coupled to a public switched telephone network (PSTN). Hosts 110, 130, and 140 are representative of any number of stationary computers and/or mobile computing devices such as laptops, handheld computers, etc. Both hosts and mobile hosts may operate as peers in a peer-to-peer configuration or as clients and servers in a client/server configuration. In one embodiment, computer system 100 or a portion thereof could be implemented as part of a cloud computing environment.

In alternative embodiments, the number and type of hosts and network elements is not limited to those shown in FIG. 1. Almost any number and combination of server, desktop, and mobile hosts may be interconnected in system 100 via various combinations of modem banks, direct LAN connections, wireless connections, WAN links, etc. Also, at various times one or more hosts may operate offline. In addition, during operation, individual host connection types may change as mobile users travel from place to place connecting, disconnecting, and reconnecting to system 100.

In the illustrated embodiment, host 110 includes resources 112A-112N that may have associated data to be protected. As used herein, elements referred to by a reference numeral followed by a letter may be collectively referred to by the numeral alone. For example, resources 112A-112N may be collectively referred to as resources 112. Resources, as used herein, may refer to data in general including picture, music, or video files, or to one or more specific volumes, directories, folders, and/or files as well as to the state of a host, a server, or an application or to the contents of a database, etc., such as Exchange, SharePoint, Oracle, DB2, SAP, etc. In the illustrated embodiment, host 110 also includes an agent 115, host 130 includes a data protection application 135, and host 140 includes a media server 145 that is coupled to a backup medium 155. Data protection application 135 may be configured to protect one or more of resources 112, such as by retrieving backup data associated with resource 112 from agent 115 and conveying the backup data to media server 145 to be stored on backup medium 155. Backup frequency may depend on a variety of factors including the urgency of data protection, storage pool capacity, network connection state, and enterprise policies. In one embodiment, backups may be done according to a schedule or at other times determined by administrative policy, security policy, or to meet other requirements of an enterprise.

In alternative embodiments, data protection application 135, media server 145, and resources 112 may be located on a single host. In other embodiments, resource 112 may be located on any number of hosts including host 130 and/or host 140. In one embodiment, backup medium 155 may be part of or included in one of hosts 140, 130, or 110, or another host coupled to network 120. These and other embodiments, which will be apparent to one of ordinary skill in the art, once the disclosures of this application have been appreciated, are possible, and are contemplated.

Figure 2:
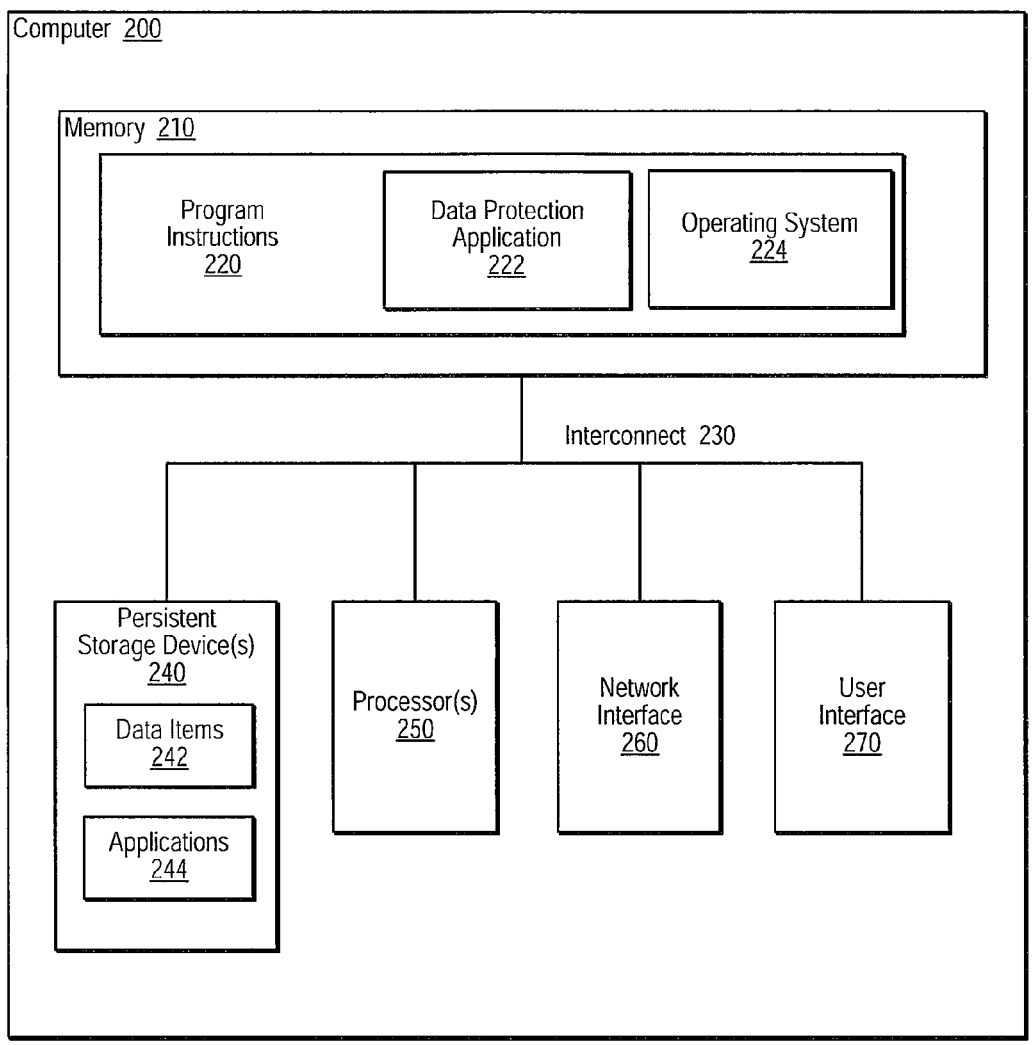
FIG. 2 illustrates one embodiment of a computer.

FIG. 2 illustrates one embodiment of a computer 200. Computer 200 may be representative of any computer apparatus described herein, e.g., host 110. Similarly, computer 200 may be used to implement any of the below-described methods. Computer 200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. It is noted that any of hosts 110 and/or host 130 or 140 may be embodied according to configuration similar to that of FIG. 2.

Computer 200 may include one or more processors 250, each of which may include multiple cores, any of which may be single or multi-threaded. Computer 200 may also include one or more persistent storage devices 240 (e.g. optical storage, magnetic storage, hard drive, tape drive, solid state memory, etc), which may include various data items (e.g., files), such as 242 and applications, such as 244. Example applications include databases, email applications, e.g. Microsoft Outlook, email and collaboration servers, e.g. Microsoft Exchange and Microsoft SharePoint, and a variety of others as known in the art. Computer 200 may include one or more memories 210 (e.g., one or more of cache, SRAM, DRAM, RDRAM, EDO RAM, DDR 10 RAM, SDRAM, Rambus RAM, EEPROM, etc.). Computer 200 may include one or more network interfaces 260 for transmitting and receiving data, such as between agents and data protection application or media servers, as described herein. Computer 200 may further include one or more user interfaces 270 for receiving user input or displaying output to users, such as a keyboard, mouse or other pointing device and a monitor or other visual display device. Various embodiments may include fewer or additional components not illustrated in FIG. 2 (e.g., video cards, audio cards, additional network interfaces, peripheral devices, a network interface such as an ATM interface, an Ethernet interface, a Frame Relay interface, etc.).

The one or more processors 250, storage device(s) 240, network interface 260, user interface 270 and system memories 210 may be coupled to system interconnect 230. One or more of the system memories 210 may contain program instructions 220. Program instructions 220 may be encoded in platform native binary, any interpreted language such as Java™ byte-code, or in any other language such as C/C++, Java™, etc or in any combination thereof.

Program instructions 220 may include program instructions executable to implement one or more data protection applications 222 described herein. According to the illustrated embodiment, memory 210 may also comprise program instructions executable to implement one or more operating systems 224, such as Windows™ and/or Linux.

The data protection applications, as described herein, may be provided as an article of manufacture that may include a tangible computer-readable storage medium having stored thereon instructions, which, if executed, may cause a computer system or computing device to perform various methods in different embodiments. A tangible computer-readable storage medium may include any mechanism for storing information in a form (e.g., software, processing application) readable by a machine (e.g., a computer). The machine-readable storage medium may include, but is not limited to, various tangible media, including magnetic storage media (e.g., floppy diskette); optical storage media (e.g., CD-ROM); magneto-optical storage media; read only memory (ROM); random access memory (RAM); erasable programmable memory (e.g., EPROM and EEPROM); flash memory; electrical, or other types of tangible media suitable for storing program instructions. In addition, program instructions may be communicated using intangible computer-readable media, including optical, acoustical, or other form of propagated signal (e.g., carrier waves, infrared signals, digital signals, etc.)

Figure 3:
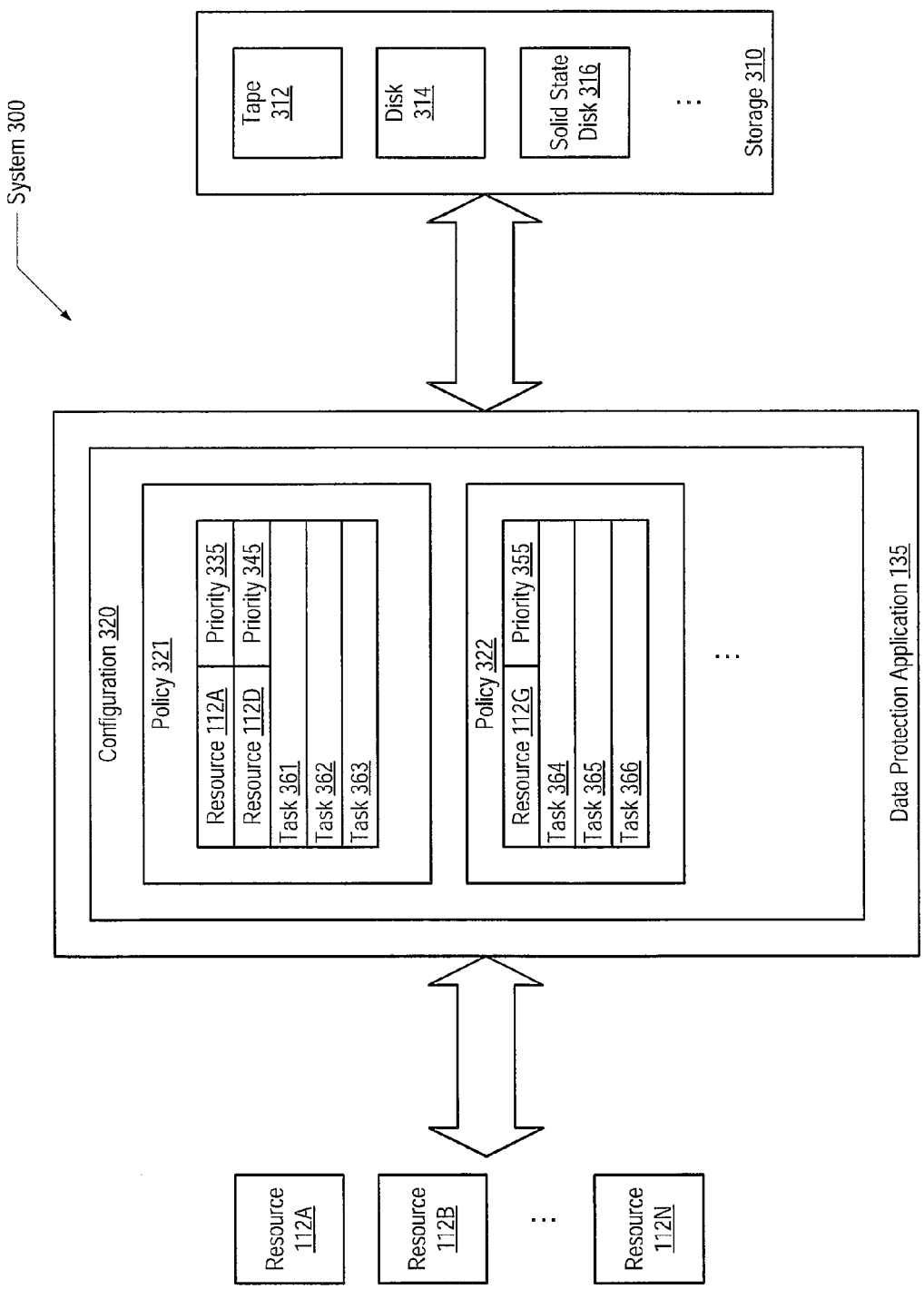
FIG. 3 is block diagram illustrating the operation of one embodiment of a data protection application.

FIG. 3 is block diagram 300 illustrating the operation of one embodiment of a data protection application 135. Data protection application 135 is shown coupled to resources 112 and to storage 310. Storage 310 may include one or more of any of a variety of storage devices such as tape 312, disk 314, and solid-state disk 316, etc. that are representative of backup media 155 as shown in FIG. 1. Application 135 may include one or more configurations 320 according to which data protection operations may be performed. Each configuration 320 may include one or more policies, such as policies 321 and 322, as shown. Each policy may include a list of resources to which the policy applies. For example, policy 321 lists resources 112A and 112D, whereas policy 322 lists resource 112G. For each listed resource, a policy may include an associated priority, such as priorities 335 and 345 that are associated with resources 112A and 112D, respectively, or priority 355 that is associated with resource 112G. In addition, each policy may include a list of tasks, such as task 361-363 of policy 321 or tasks 364-366 of policy 322.

During operation, data protection application 135 may transmit and receive data corresponding to resources 112 from one or more hosts computer systems and convey or retrieve backup datasets including data corresponding to resources 112 to or from storage 310. In one embodiment, backup datasets may be created and stored in response to a user command in an ad hoc manner and/or as scheduled by the priorities and tasks specified in one or more policies. For instance, a priority may specify that a particular data protection task protecting a particular resource should be performed at a high frequency, such as daily or alternatively at a low frequency, such as weekly. A particular task may specify a method of data protection, such as a full or incremental backup, replication, etc, should be performed on a particular schedule, such as on Friday at 1:00 AM. Priorities may have values of very high, high, medium, low, and very low, or any similar range of values. Task methods may include full backup, incremental backup, replication, snapshot, restore, etc. Task methods may be performed at times and intervals specified in the task, such as daily at a particular time, weekly on a particular day, etc. Data protection policies and their tasks may include more detailed information as described below.

Listing 1. illustrates one embodiment of a set of data protection policies for protecting two servers.

Listing 1. Sample Policy and Protected Resource
  Policy X: Server A (C:[M], D:[M], SQL Database[H])
    and Server B (C:[M], D:[M], E:[M])
    Task A—Weekly (Friday at 1:00 AM) Full Backup to
      disk storage using media set with 1 month retention
    Task B—Daily (8:00 PM) Incremental to disk storage
      using media set with 1 week retention
    Task C—Duplicate (2:00 PM Friday) backup generated from task A to online tape library using media
      set with 1 year retention
  Policy Y: Server B (Exchange Database [VH] [GRT])
    Task A—Weekly (Friday at 1:00 AM) Full Backup to
      disk storage using media set with 1 month retention
    Task B—Daily (1:00 AM) Incremental to disk storage
      using media set with 1 week retention
    Task C—Duplicate (10:00 AM Friday) backup generated from task A to online tape library using
      media set with 1 year retention
    Task D—Duplicate (4:00 PM Friday) backup generated from task C to online tape library using media
      set with 7 year retention and associated with offsite
      vault rule As listed above, policy X applies to servers A and B. Within server A, policy X applies a medium priority [M] to volumes C: and D: and a high priority [H] to a SQL database. Within server B, policy X applies a medium priority [M] to volumes C:, D:, and E:. Policy X schedules protection methods for these resources via tasks A, B, and C. Task A is scheduled to perform a full backup to disk storage using a media set with 1 month retention, weekly on Friday at 1:00 AM. Task B is scheduled to perform an incremental backup to disk storage using a media set with 1 week retention, every day at 8:00 PM. Task C is scheduled to duplicate the backup generated from task A to an online tape library using a media set with 1-year retention at 2:00 PM every Friday. Policy Y: applies to an Exchange database within Server B with a priority of very high [VH] and further specifies a recovery technology known as granular recovery technology [GRT]. Tasks A-D of policy Y may be interpreted in a similar manner as tasks A-C of policy X.

Figure 4:
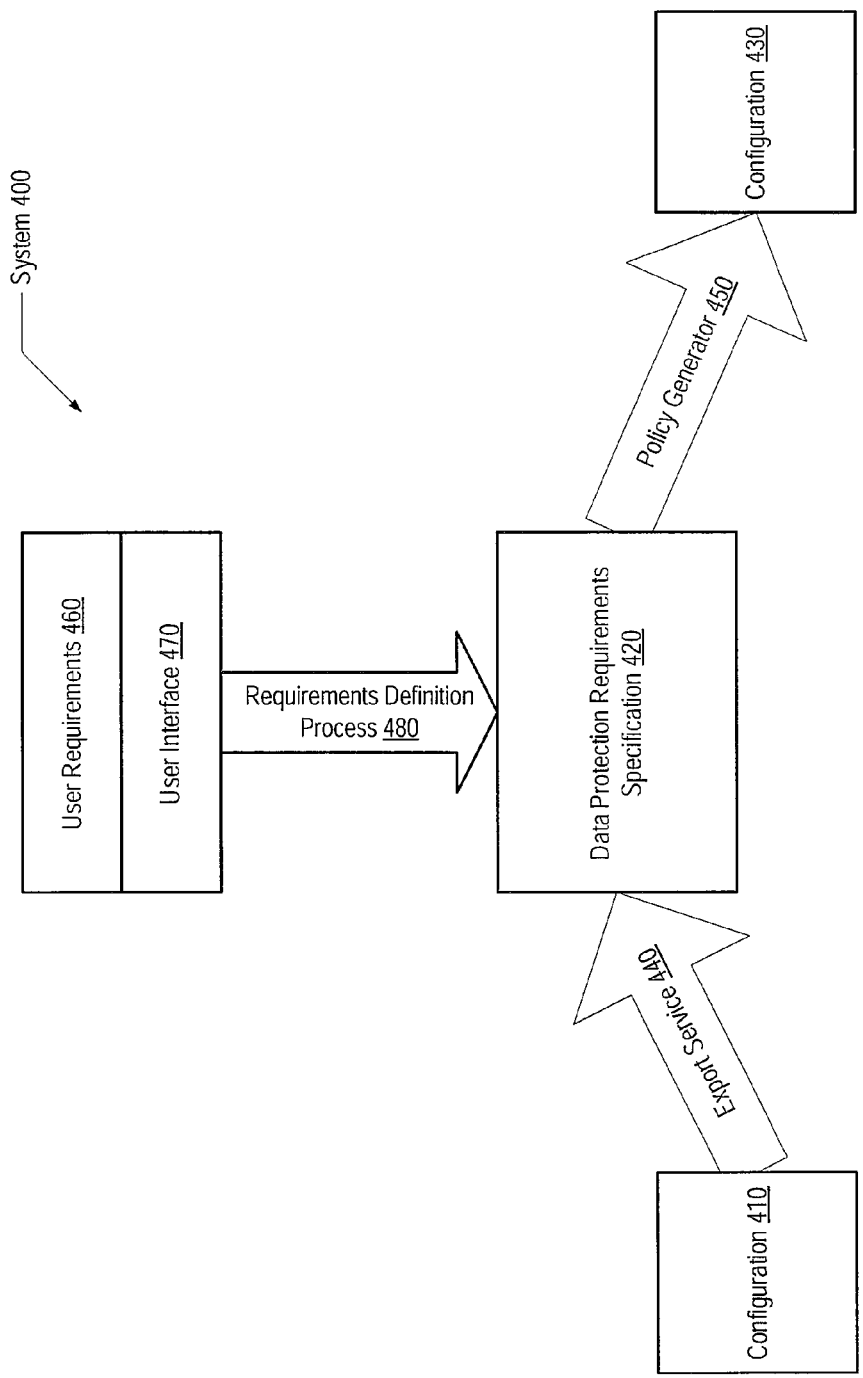
FIG. 4 illustrates one embodiment of a system that uses a data protection requirements specification.

It is noted that the data protection policies and tasks illustrated above are specific to a single data protection application. The syntax and format in which these policies and tasks are expressed form an application-specific schema. However, different data protection applications may have different policy and task capabilities and be expressed in different application-specific schema. To accommodate these differences, a data protection requirements specification (DPRS) may be used to generalize the information contained in a data protection application's configuration and express the abstract requirements that result in a common schema that may differ from any particular application-specific schema and is not specific to any particular data protection application. FIG. 4 illustrates one embodiment of a system 400 that uses a data protection requirements specification. In the illustrated embodiment, system 400 includes configurations 410 and 430, a Data Protection Requirements Specification (DPRS) 420, an export service 440, a policy generator 450, user requirements 460, a user interface 470, and a requirements definition process 480. In various embodiments, configurations 410 and 430 may be two different instances of configurations of a single data protection application, or more generally, instances of two different data protection applications. DPRS 420 may be used in a variety of scenarios. For example, suppose configuration 410 is an existing configuration of a particular data protection application and a user desires an abstract representation of the configuration. The user may trigger export service 440 to interpret configuration 410 and convert the interpretation into a standard schema defined for the specification of data protection requirements. The interpretation may then be expressed as DPRS 420. One example of a DPRS schema written in extended markup language (XML) is presented in Listing 2.

Listing 2. DPRS in XML format.

```xml
<?xml version="1.0" encoding="utf-8" ?>
  <DataProtectionRequirementSpecification
    ID="GUID#1"    mlns:xsi="http://www.w3.org/2001/
    XMLSchema-instance"">
    <DataClassification>
      <DataClass>
        <Class>Exchange</Class>
        <DataLifeCyclePlanID>GUID#2</DataLifeCyclePlanID>
        <ProtectionFrequencyLevel>8</ProtectionFrequencyLevel>
        <ExecutionWindow>3</ExecutionWindow>
        <ImportanceLevel>Platinum</ImportanceLevel>
        <AdditionalSpecs>
          <ApplicationGRT>Requirement</ApplicationGRT>
        </AdditionalSpecs>
      </DataClass>
      <DataClass>
        <Class>FileFolder</Class>
        <DataLifeCyclePlanID>GUID#1</DataLifeCyclePlanID>
        <ProtectionFrequencyLevel>8</ProtectionFrequencyLevel>
        <ExecutionWindow>3</ExecutionWindow>
        <ImportanceLevel>Silver</ImportanceLevel>
      </DataClass>
      <DataClass>
        <Class>SQL</Class>
        <DataLifeCyclePlanID>GUID#1</DataLifeCyclePlanID>
        <ProtectionFrequencyLevel>8</ProtectionFrequencyLevel>
        <ExecutionWindow>3</ExecutionWindow>
        <ImportanceLevel>Gold</ImportanceLevel>
      </DataClass>
    </DataClassification>
    <DataLifeCycleStrategy>
      <DataLifeCyclePlan    ID="GUID#1"
        Name="LifeCycleA">
        <ProtectionPoint    ID="GUID#A"
          SourceID="GUID#A">
          <FrequencyLevel>8</FrequencyLevel>
          <AvailabilityLevel>
            <MediaImmediateAccessibility>true</MediaImmediateAccessibility>
            <MediaOnline>true</MediaOnline>
            <MediaOnSite>true</MediaOnSite>
            <RandomAccessbility>true</RandomAccessbility>
          </AvailabilityLevel>
          <DataRetentionLevel>2</DataRetentionLevel>
        </ProtectionPoint>
        <ProtectionPoint    ID="GUID#B"
          SourceID="GUID#B">
          <FrequencyLevel>10</FrequencyLevel>
          <AvailabilityLevel>
            <MediaImmediateAccessibility>true</MediaImmediateAccessibility>
            <MediaOnline>true</MediaOnline>
            <MediaOnSite>true</MediaOnSite>
            <RandomAccessbility>true</RandomAccessbility>
          </AvailabilityLevel>
          <DataRetentionLevel>4</DataRetentionLevel>
        </ProtectionPoint>
        <ProtectionPoint    ID="GUID#C"
          SourceID="GUID#B">
          <FrequencyLevel>10</FrequencyLevel>
          <AvailabilityLevel>
            <MediaImmediateAccessibility>false</MediaImmediateAccessibility>
            <MediaOnline>true</MediaOnline>
            <MediaOnSite>true</MediaOnSite>
            <RandomAccessbility>false</RandomAccessbility>
          </AvailabilityLevel>
          <DataRetentionLevel>6</DataRetentionLevel>
          <AdditionalProtectionPointSpecs>
            <Schedule>
              <Restriction>Hint</Restriction>
              <ExecutionWindow>2</ExecutionWindow>
              <RecurrencePattern>
                <RecurrenceByWeek>Friday</RecurrenceByWeek>
              </RecurrencePattern>
            </Schedule>
          </AdditionalProtectionPointSpecs>
        </ProtectionPoint>
      </DataLifeCyclePlan>
      <DataLifeCyclePlan    ID="GUID#2"
        Name="LifeCycleB">
        <ProtectionPoint    ID="GUID#D"
          SourceID="GUID#D">
          <FrequencyLevel>8</FrequencyLevel>
          <AvailabilityLevel>
            <MediaImmediateAccessibility>true</MediaImmediateAccessibility>
            <MediaOnline>true</MediaOnline>
            <MediaOnSite>true</MediaOnSite>
            <RandomAccessbility>true</RandomAccessbility>
          </AvailabilityLevel>
          <DataRetentionLevel>2</DataRetentionLevel>
        </ProtectionPoint>
        <ProtectionPoint    ID="GUID#E"
          SourceID="GUID#E">
```

```xml
        <FrequencyLevel>10</FrequencyLevel>
        <AvailabilityLevel>
        <MediaImmediateAccessibility>true</MediaImmediateAccessibility>
        <MediaOnline>true</MediaOnline>
        <MediaOnSite>true</MediaOnSite>
        <RandomAccessbility>true</RandomAccessbility>
        </AvailabilityLevel>
        <DataRetentionLevel>4</DataRetentionLevel>
    </ProtectionPoint>
        <ProtectionPoint        ID="GUID#F"
        SourceID="GUID#E">
        <FrequencyLevel>10</FrequencyLevel>
        <AvailabilityLevel>
        <MediaImmediateAccessibility>false</MediaImmediateAccessibility>
        <MediaOnline>true</MediaOnline>
        <MediaOnSite>true</MediaOnSite>
        <RandomAccessbility>false</RandomAccessbility>
        </AvailabilityLevel>
        <DataRetentionLevel>6</DataRetentionLevel>
        <AdditionalProtectionPointSpecs>
        <Schedule>
        <Restriction>Requirement</Restriction>
        <ExecutionWindow>2</ExecutionWindow>
        <RecurrencePattern>
        <RecurrenceByWeek>Friday</RecurrenceByWeek>
        </RecurrencePattern>
        </Schedule>
        </AdditionalProtectionPointSpecs>
    </ProtectionPoint>
        <ProtectionPoint        ID="GUID#G"
        SourceID="GUID#E">
        <FrequencyLevel>10</FrequencyLevel>
        <AvailabilityLevel>
        <MediaImmediateAccessibility>false</MediaImmediateAccessibility>
        <MediaOnline>false</MediaOnline>
        <MediaOnSite>false</MediaOnSite>
        <RandomAccessbility>false</RandomAccessbility>
        </AvailabilityLevel>
        <DataRetentionLevel>9</DataRetentionLevel>
        <AdditionalProtectionPointSpecs>
        <Schedule>
        <Restriction>Hint</Restriction>
        <ExecutionWindow>2</ExecutionWindow>
        <RecurrencePattern>
        <RecurrenceByWeek>Friday</RecurrenceByWeek>
        </RecurrencePattern>
        </Schedule>
        </AdditionalProtectionPointSpecs>
    </ProtectionPoint>
    </DataLifeCyclePlan>
    </DataLifeCycleStrategy>
</DataProtectionRequirementSpecification>
```

As shown in Listing 2, this particular DPRS specifies three data classifications: Exchange, FileFolder, and SQL, each of which has a number of attributes including a data life cycle plan ID, a protection frequency level, an execution window, an importance level, and one or more additional specifications. For example, the "Exchange" data class identifies in lines 6-13 of Listing 2 a corresponding data lifecycle plan ID of "GUID#2", a protection frequency level of "8", an execution window of "3", an importance level of "Platinum", and an additional specification that granular recovery technology is required to be used.

The DPRS of listing 2 also specifies a number of protection points within a data life cycle strategy, each of which specifies values for various parameters such as frequency level, availability level, and data retention level. For example, the frequency level specified in lines 32-41 of Listing 2 for the protection point whose ID is "GUID#A" is level "8", the availability level includes immediate, random accessibility of online, onsite media, and the data retention level is level "2".

Another protection point specification is the restriction specification, which indicates whether other specifications of a particular data protection point are required of, preferred of, or provided as a hint for a data protection application. Another protection point specification that applies to schedules is the execution window that specifies one or more recurrence patterns. Examples of each of these specifications may be seen in Listing 2. A process by which export service 440 may generate a DPRS is described below.

Suppose further that the user desires to create a configuration for a different data protection application, such as configuration 430, using a DPRS that has been generated by export service 440 or acquired from a third party or form user input. In this scenario, the user may trigger policy generator 450 to translate DPRS 420 into specific policy provisions for configuration 430, taking into account the capabilities of the data protection application to which configuration 430 corresponds. Policy generator 450 may guide the user in creating configuration 430 by translating specific elements in DPRS 420 into corresponding policy provisions in configuration 430 in cases where a direct translation is available and allowing the user to make selections in configuration 430 in cases where a direct translation is not available. In one embodiment, a vendor of the data protection application to which configuration 430 corresponds may create a policy generator 450 with specific translation capabilities for policy provisions of the data protection application for which there are known, pre-defined expressions in the schema used by the DPRS.

Listing 3 is a description of one embodiment of a policy generated from a DPRS. A process by which policy generator 450 may generate such a policy from a DPRS is described below.

Listing 3. Sample Policy and Protected Resource
Policy I: All volumes (Server A and Server B)
    Task A—Weekly (Friday at 8:00 PM) synthetic full backup to disk storage unit and tape volume pool (using inline tape copy)
    One month retention for disk copy
    One year retention for tape copy
    Task B—Daily (8:00 PM) Incremental to a disk storage unit with 1 week retention
Policy II: SQL (Server A)
    Task A—Weekly (Friday at 8:00 PM) full backup to disk storage unit and tape volume pool (using inline tape copy)
    One month retention for disk copy
    One year retention for tape copy
    Task B—Daily (8:00 PM) Incremental to a disk storage unit with 1 week retention
Policy III: Exchange (Server B)
    Task A—Weekly (Friday at 8:00 PM) full backup to a disk storage unit, a online volume pool and a vault volume pool (using inline tape copy)

One month retention for the disk copy
One year retention for the online volume pool copy
Task B Create a backup vault profile for policy III sourcing from vault volume pool
Seven year retention for the vault volume pool copy In a still further scenario, a user may create a new, abstract DPRS by entering user requirements 460 through user interface 470 and directing requirements definition process 480 to convert the input requirements into the standard schema defined for the specification of data protection requirements. Listing 4 is a description of one embodiment of a protection strategy expressed in terms that may be familiar to a user without expertise in data protection application configuration details. A process by which user inputs may be captured and used to generate a DPRS is described further below.

Figure 5:
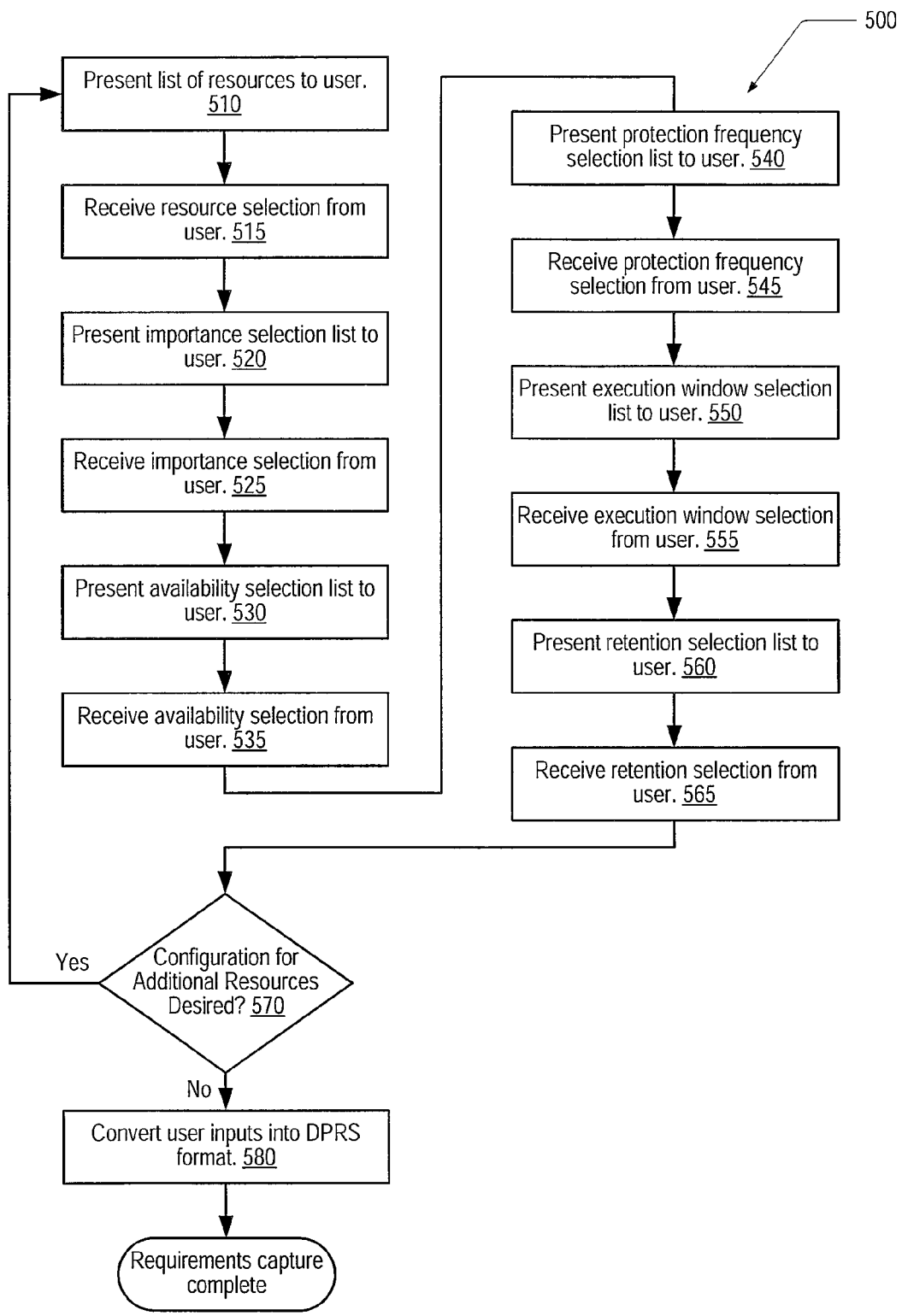
FIG. 5 illustrates one embodiment of a process that may be used to capture user inputs for generating a DPRS.

Listing 4. Two Data Lifecycle plans:
For Exchange
Have a recovery point every day.
Keep daily recovery points for 1 week
Keep weekly recovery points for 1 year total
Maintain recovery points highly available for one month
Protect weekly recovery points for 7 years in separate site for legal compliance and/or DR protection
For SQL and File system:
Have a recovery point every day.
Keep daily recovery points for 1 week
Keep weekly recovery points for 1 year total
Maintain recovery points highly available for one month The following discussions will detail how these specifications may be generated from an existing data protection application configuration, from user inputs, or used to generate a new data protection application configuration. FIG. 5 illustrates one embodiment of a process 500 that may be used to capture user inputs for generating a DPRS. Process 500 may begin with presentation of a list of resource to a user (block 510). In response to presentation of the list of resources, a resource selection may be received from the user (block 515). An importance selection list may then be presented to the user (block 520). In response to presentation of the importance selection list, an importance selection may be received from the user (block 525). An availability selection list may then be presented to the user (block 530). In response to presentation of the availability selection list, an availability selection may be received from the user (block 535). A protection frequency selection list may then be presented to the user (block 540). In response to presentation of the protection frequency selection list, a protection frequency selection may be received from the user (block 545). An execution window selection list may then be presented to the user (block 550). In response to presentation of the execution window selection list, an execution window selection may be received from the user (block 555). A retention selection list may then be presented to the user (block 560). In response to presentation of the retention selection list, a retention selection may be received from the user (block 565). If configuration for an addition resource is desired (decision block 570), process 500 may continue at block 510. Otherwise, if all of the user's desired selections have been received, the user inputs may be converted to a DPRS format (block 580), completing the requirements capture process.

Figure 6:
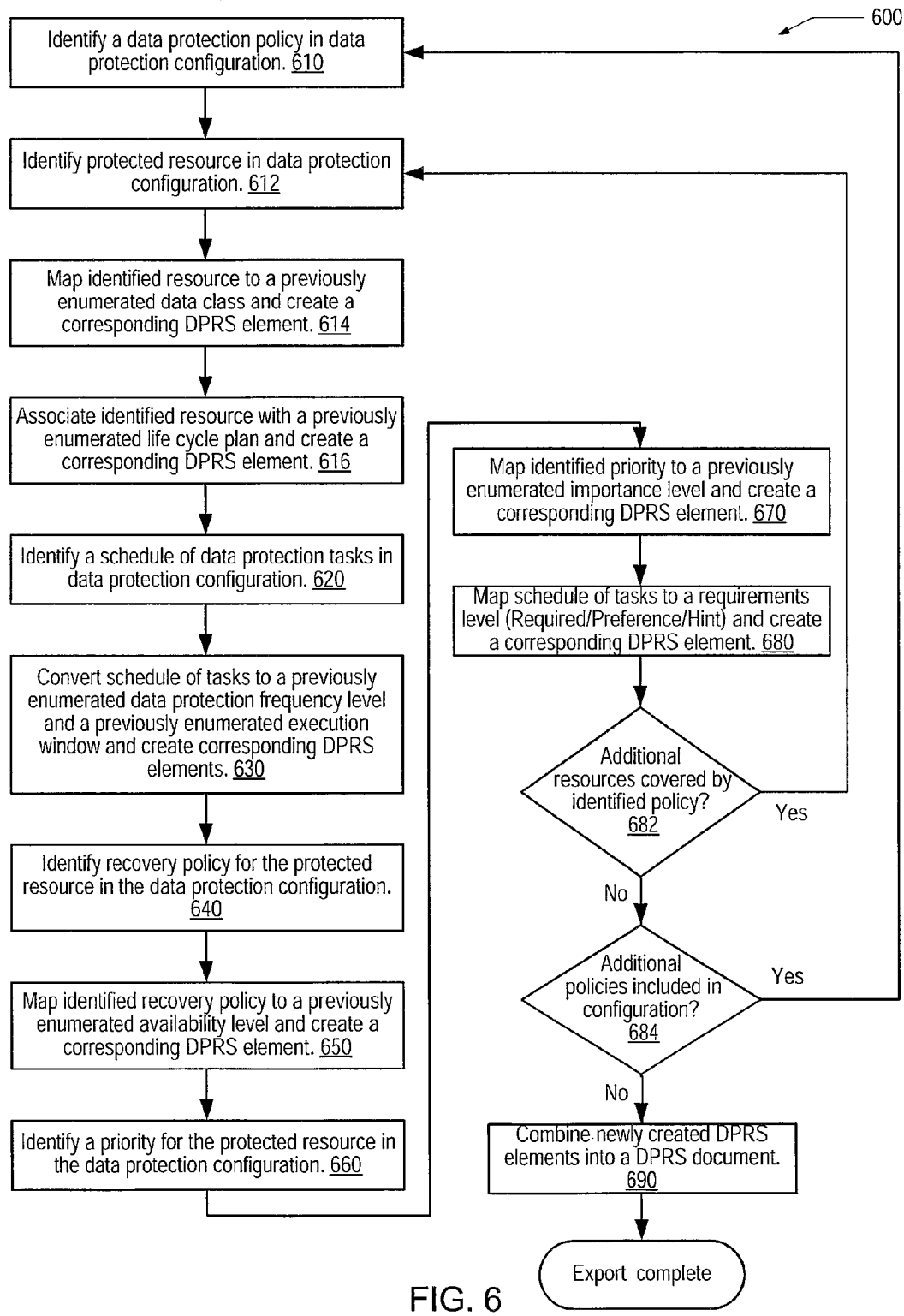
FIG. 6 illustrates one embodiment of a process that may be used to export a data protection application configuration for generating a DPRS.

FIG. 6 illustrates one embodiment of a process 600 that may be used to export a data protection application configuration for generating a DPRS. Process 600 may begin with identification of a data protection policy within a data protection configuration (block 610). A resource that is associated with the identified policy may then be identified (block 612). The identified resource may be mapped to a data class that has previously been enumerated in a DPRS schema and a corresponding element may be added to the DPRS (block 614). Once the identified resource has been mapped to a data class, it may be associated with a life cycle plan that has been enumerated in a DPRS schema and a corresponding element may be added to the DPRS (block 616). Next, one or more scheduled data protection tasks that protect the identified resource may be identified in the data protection configuration (block 620). For each identified task, schedule attributes that correspond to a frequency level may be extracted from the task and mapped to a frequency level that has previously been enumerated in a DPRS schema and a corresponding element may be added to the DPRS (block 630). In addition, for each identified task, schedule attributes that correspond to an execution window level may be extracted from the task and mapped to an execution window that has previously been enumerated in a DPRS schema and a corresponding element may be added to the DPRS (block 630). For each identified resource, a recovery policy may be identified in the data protection configuration (block 640). The identified recovery policy may be mapped to an availability level that has previously been enumerated in a DPRS schema and a corresponding element may be added to the DPRS (block 650). For each identified resource, a priority may be identified in the data protection configuration (block 660). The identified priority may be mapped to an importance level that has previously been enumerated in a DPRS schema and a corresponding element may be added to the DPRS (block 670). For each resource and corresponding scheduled data protection tasks, additional information may be identified in the data protection configuration that indicates and may be mapped to a previously been enumerated requirements level in a DPRS schema (such as required, preferred, or hint) and a corresponding element may be added to the DPRS (block 680). If the identified data protection policy applies to an additional resource (decision block 682), blocks 612-680 may be repeated for the additional resource. If the identified data protection policy does not apply to an additional resource (decision block 682) and if the data protection configuration includes an additional data protection policy (decision block 684), locks 610-682 may be repeated for the additional data protection policy. If the data protection configuration does not include an additional data protection policy (decision block 684), the newly created DPRS elements may be combined into a DPRS document (block 690), completing the export process.

Figure 7:
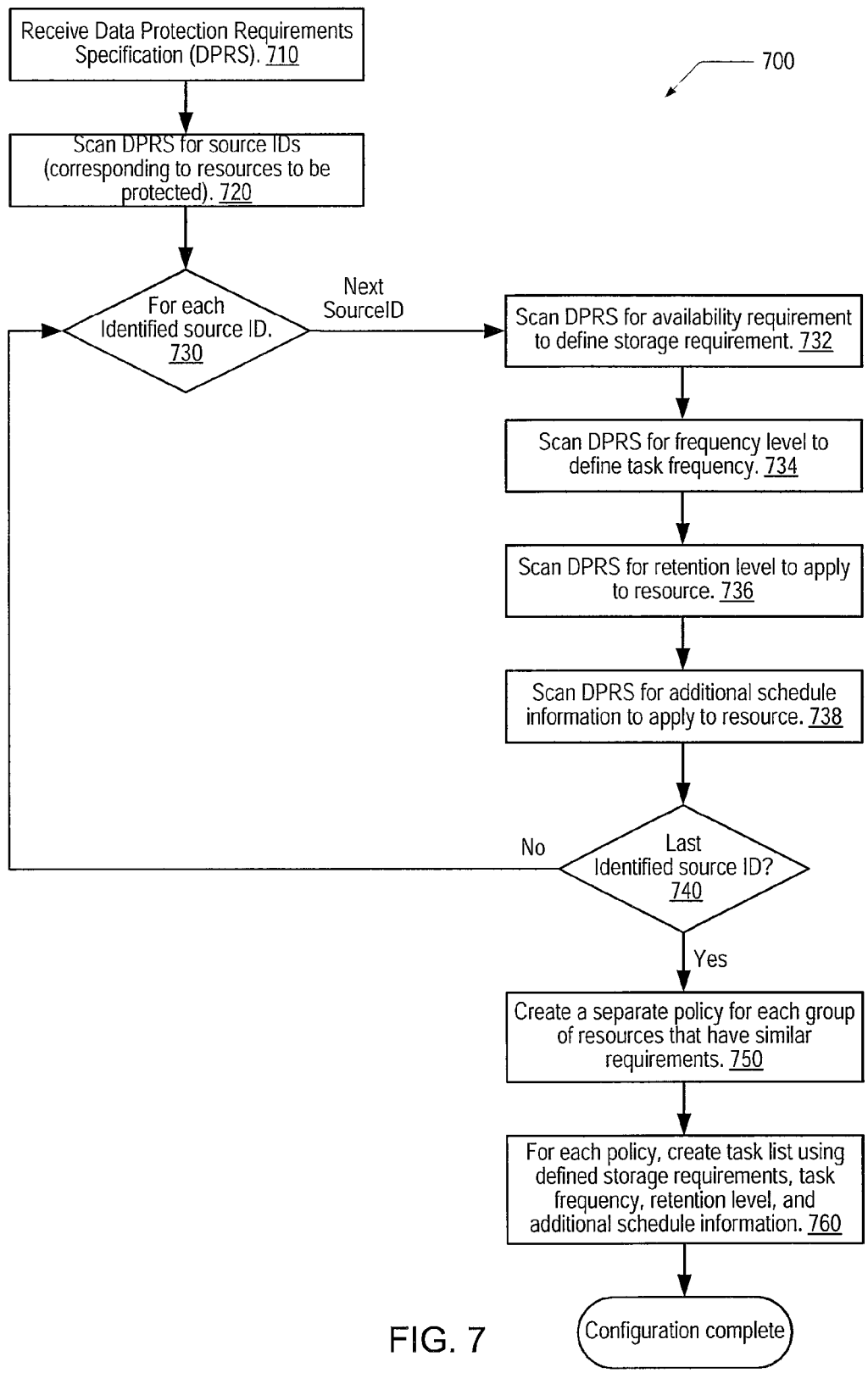
FIG. 7 illustrates one embodiment of a process that may be used to generate a data protection application configuration from an existing DPRS While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

FIG. 7 illustrates one embodiment of a process 700 that may be used to generate a data protection application configuration from an existing DPRS. Process 700 may begin with reception of an existing data protection requirements specification (DPRS) (block 710). The DRPS may be scanned for elements that indicate a source ID (block 720). Each identified source ID may be interpreted as corresponding to a resource to be protected. For each identified source ID (decision block 730), the DPRS may be scanned for elements that indicate availability requirements. One or more elements that indicate availability requirements may be used to define a storage requirement in a data protection policy for the resource to be protected (block 732). For example, elements in the DPRS that indicate an availability requirement of immediate and random accessibility via online and onsite media may be interpreted as requiring use of a local disk or solid-state media for storage of backup datasets.

Next, the DPRS may be scanned to identify an element indicating a frequency level of data protection operations. An element that indicates a frequency level requirement may be used to define a frequency level of execution of data protection tasks in a data protection policy for the resource to be protected (block 734). The DPRS may be scanned to identify an element indicating a retention level of backup datasets that correspond to the resource to be protected. An element that indicates a retention level requirement may be used to define a retention level in a data protection policy that corresponds to the resource to be protected (block 736). The DPRS may be scanned to identify elements indicating additional schedule information that corresponds to the resource to be protected. One or more elements that indicate additional schedule information may be used to determine whether other elements found in the DPRS are to be required, preferred, or used as a hint in defining a data protection policy that corresponds to the resource to be protected (block 738). If an additional source ID has been identified in the DPRS (decision block 740), blocks 730-738 may be repeated for the additional source ID. If no additional source IDs have been identified in the DPRS (decision block 740), for each group of resources that have similar requirements, a separate policy may be created (block 750). For each policy that is created, a task list may be created using the defined storage requirements, task frequency requirements, retention level, and additional schedule information (block 760), completing configuration process 700.

It is noted that the foregoing flow charts are for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of protecting data in a computer system using a common schema, the method comprising:
    performing by a processor:
        extracting attributes from a first data protection policy corresponding to a first data protection product for protecting data associated with at least one resource, wherein the attributes are expressed in a first application specific schema;
        mapping the extracted attributes to values of elements pre-defined by a common, non-application specific schema for representing a plurality of application specific schemas;
        combining the values of elements in a document using the common, non-application specific schema;
        generating from the document a second data protection policy corresponding to a second data protection product for protecting the at least one resource, wherein attributes of the second data protection policy are expressed in the second application specific schema, wherein the second data protection product is different from the first data protection product; and
        using the second data protection policy migrated from the first data protection policy to protect data associated with the at least one resource;
    wherein generating the second data protection policy comprises a policy generator executed by the processor:
        scanning the document;
        identifying one or more elements of the document; and
        translating values of the one or more elements to corresponding one or more attributes of the second data protection policy expressed in the second schema;
        wherein a value of a first element in the common schema corresponds to the at least one resource to be protected.

2. The method of claim 1, wherein the second data protection policy includes one or more tasks to be performed to protect the at least one resource, each task having at least one of the one or more attributes.

3. The method of claim 2, wherein the one or more attributes are taken from a group of attributes including at least one of:
    storing data used to protect the at least one resource on a particular type of medium;
    executing one or more tasks at a particular frequency; and
    retaining data used to protect the at least one resource for a particular length of time.

4. The method of claim 2, wherein at least one of the one or more elements specifies a frequency level, and wherein the method further comprises including in the second data protection policy, a frequency of execution of data protection tasks for the at least one resource corresponding to the frequency level.

5. The method of claim 2, wherein at least one of the one or more elements specifies a retention level, and wherein the method further comprises including in the second data protection policy, a time period during which a dataset that is used to protect the at least one resource is retained that corresponds to the retention level.

6. The method of claim 1, further comprising:
    receiving requirements for protecting data associated with the at least one resource as user input data; and
    converting the user input data into the common schema using one or more elements pre-defined by the common schema.

7. The method of claim 1, wherein the document utilizes the format of a data protection requirements specification (DPRS).

8. A computer system comprising:
    at least one processor;
    a policy generator component executable by the processor; and
    at least one resource, each resource having associated data to be protected;
    wherein the policy generator is executable to:
        extract attributes from a first data protection policy corresponding to a first data protection product for protecting data associated with at least one resource, wherein the attributes are expressed in a first application specific schema;

map the extracted attributes to values of elements pre-defined by a common, non-application specific schema for representing a plurality of application specific schemas;

combine the values of elements in a document using the common, non-application specific schema;

generate from the document a second data protection policy corresponding to a second data protection product for protecting the at least one resource, wherein attributes of the second data protection policy are expressed in the second application specific schema, wherein the second data protection product is different from the first data protection product; and use the second data protection policy migrated from the first data protection policy to protect data associated with the at least one resource;

wherein to generate the second data protection policy, the policy generator is configured to:
scan the document;
identify one or more elements of the document; and
translate values of the one or more elements to corresponding one or more attributes of the second data protection policy expressed in the second schema;
wherein a value of a first element in the common schema corresponds to the at least one resource to be protected.

9. The system of claim 8, wherein the second data protection policy includes one or more tasks to be performed to protect the at least one resource, each task having at least one of the one or more attributes.

10. The system of claim 9, wherein the one or more attributes are taken from a group of attributes including at least one of:
storing data used to protect the at least one resource on a particular type of medium;
executing one or more tasks at a particular frequency; and
retaining data used to protect the at least one resource for a particular length of time.

11. The system of claim 9, wherein at least one of the one or more elements specifies a frequency level and wherein the policy generator is further configured to include in the second data protection policy, a frequency of execution of data protection tasks for the at least one resource corresponding to the frequency level.

12. The system of claim 9, wherein at least one of the one or more elements specifies a retention level and wherein the at least one processor is further configured to include in the second data protection policy, a time period during which a dataset that is used to protect the at least one resource is retained that corresponds to the retention level.

13. The system of claim 8, wherein the policy generator is further configured to:
receive requirements for protecting data associated with the at least one resource as user input data; and
convert the user input data into the DPRS using one or more elements pre-defined by the common schema.

14. The system of claim 8, wherein the document utilizes the format of a data protection requirements specification (DPRS).

15. A non-transitory computer readable storage medium storing computer instructions that are executable by a processor to:
extract attributes from a first data protection policy corresponding to a first data protection product for protecting data associated with at least one resource, wherein the attributes are expressed in a first application specific schema;

map the extracted attributes to values of elements pre-defined by a common, non-application specific schema for representing a plurality of application specific schemas;

combine the values of elements in a document using the common, non-application specific schema;

generate from the document a second data protection policy corresponding to a second data protection product for protecting the at least one resource, wherein attributes of the second data protection policy are expressed in the second application specific schema, wherein the second data protection product is different from the first data protection product; and use the second data protection policy migrated from the first data protection policy to protect data associated with the at least one resource;

wherein generating the second data protection policy comprises:
scanning the document;
identifying one or more elements of the document; and
translating values of the one or more elements to corresponding one or more attributes of the second data protection policy expressed in the second schema;
wherein a value of a first element in the common schema corresponds to the at least one resource to be protected.

16. The computer readable medium as recited in claim 15, wherein the second data protection policy includes one or more tasks to be performed to protect the at least one resource, each task having at least one of the one or more attributes; and
wherein the one or more attributes are taken from a group of attributes including at least one of:
storing data used to protect the at least one resource on a particular type of medium;
executing one or more tasks at a particular frequency; and
retaining data used to protect the at least one resource for a particular length of time.

17. The computer readable medium as recited in claim 15, wherein the instructions are further executable by the processor to:
receive requirements for protecting data associated with the at least one resource as user input data; and
convert the user input data into the DPRS using one or more elements pre-defined by the common schema.

* * * * *